United States Patent [19]

Gruner

[11] 3,746,896
[45] July 17, 1973

[54] ELECTROMAGNETIC FLOW TRANSDUCERS HAVING LAMINAR ELECTRODES

[75] Inventor: Heinz Walter Gruner, Rochester, N.Y.

[73] Assignee: Sybron Corporation, Rochester, N.Y.

[22] Filed: June 12, 1972

[21] Appl. No.: 262,111

[52] U.S. Cl. .............................. 310/11, 73/194 EM
[51] Int. Cl. .......................... G01p 5/08, H02n 4/00
[58] Field of Search ................. 73/194 EM; 310/11

[56] References Cited
UNITED STATES PATENTS

| 2,844,568 | 7/1958 | Mertz | 73/194 EM |
| 2,949,551 | 8/1960 | Sturgeon | 73/194 EM |
| 3,194,068 | 7/1965 | Mannherz et al. | 73/194 EM |
| 3,614,489 | 10/1971 | Jensen et al. | 310/11 |

Primary Examiner—L. T. Hix
Attorney—Theodore B. Roessel

[57] ABSTRACT

A flow transducer in the form of a section of conduit having laminar electrodes bonded to the inside surface of the section, over holes through the wall of the section. Wire leads, fastened to the electrodes, extend out of the holes for connection to measuring circuitry external to the section. The holes are otherwise filled with a sealant, such as glass.

6 Claims, 5 Drawing Figures

Patented July 17, 1973 3,746,896

ELECTROMAGNETIC FLOW TRANSDUCERS HAVING LAMINAR ELECTRODES

FIELD OF THE INVENTION

The present invention relates to an electromagnetic flow transducer. This is essentially a section of conduit through which conductive liquid is to flow, transverse to the direction of a magnetic field passing through the section, thereby inducing voltages in the liquid, which voltages are picked-up by electrodes on the inside of the pipe section.

DESCRIPTION OF THE PRIOR ART

In the past, such electrodes have taken various forms: screw terminals, plates, foils etc., and in general, in each case, connection of the electrodes to voltage measuring equipment, or equivalent, was made through the wall of the section, so the electrode structure had to include something in the nature of a gland or stuffing box to prevent escape of liquid through the holes in the wall. Typical problems encountered by past electrode structures were electrode fouling, leakage, and so forth, as is to be expected in view of the nature of commonly encountered fluent materials, as, for example, sewage, chemical solutions, slurries and so forth.

SUMMARY

According to the present invention, electromagnetic flow meter electrodes take the form of platinum or equivalent laminae sealingly covering holes in a section of conduit, and conductively connected to lead wires in said holes, which are otherwise solidly filled with sealant, such as glass bonding the wires to the next adjacent conduit surface in the holes and laminae. The laminae are initially painted, sprayed, or plated on the inner surface of the section, and the holes are fitted with a glass frit which is then fused in place, thereby creating an integral bond between electrodes, wire leads, and section, which bond hermetically and rigidly seals the electrodes and lead wires in place. Further, the bond is corrosion proof, and is at least as thermally and mechanically indestructible as the section of conduit. Conversely, the electrode structure according to the invention is also simple, inexpensive and easy to fabricate. Finally, the laminae may be made so thin that they offer substantially no obstruction to flow whatsoever, and, if fouled, are easily cleanable to a like-new condition.

DESCRIPTION OF THE PREFERRED EMBODIMENTS

Figure 1:
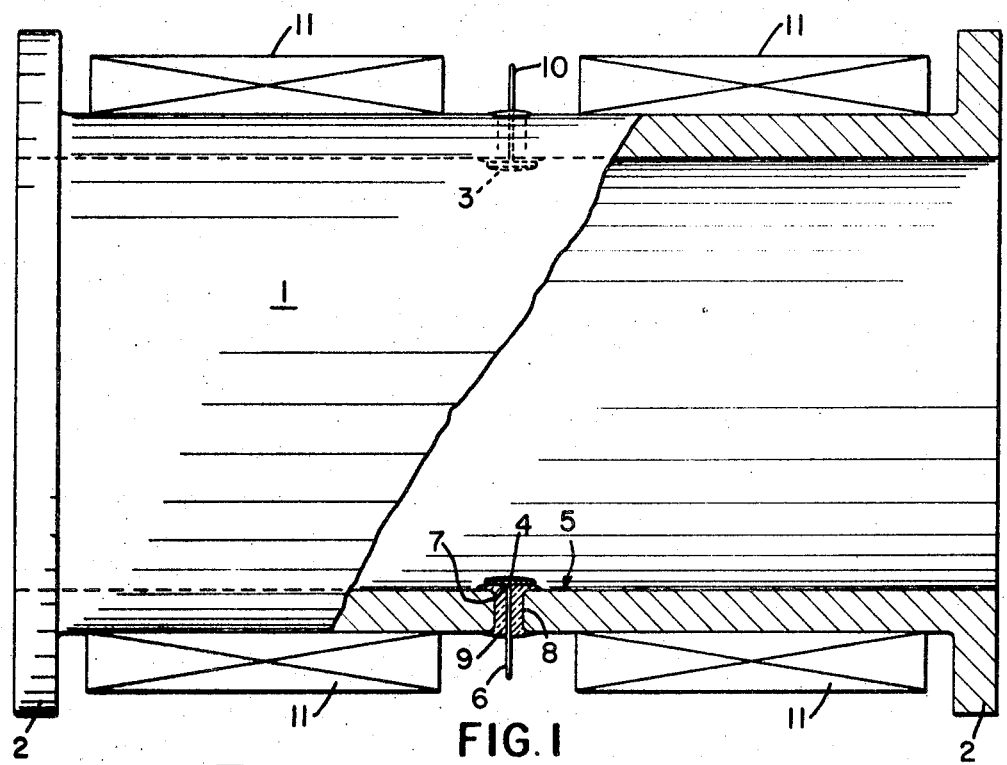
FIG. 1 is a partial sectional plan view of a right cylindrical section of conduit in an electromagnetic flow transducer, showing an electrode structure according to the invention, the section being taken in the plane A—A of FIG. 2.
Figure 2:
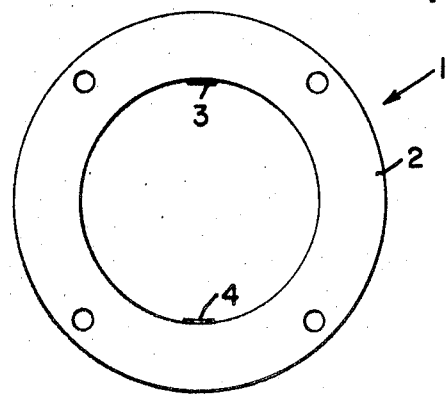
FIG. 2 is an end elevation, reduced in size, of the transducer shown in FIG. 1.

In FIGS. 1 and 2, a section 1 of conduit, having suitable end flanges 2, or equivalent, for inserting into a flow line, for measuring the rate of flow of fluid through said line, has laminar electrodes 3 and 4 mounted flush on the inner surface of section 1. Electrode 4 has a wire lead 6 soldered or welded to its surface next surface 5, at 7, and from there the lead passes out of section 1 through the outer surface 9 and is solidly filled with sealant 9.

Sealant 9 is preferably in the form of a fused glass frit, frit being common parlance for a granular mix of materials which, when melted, will form a glass that will bond to ceramic, metal and other materials. Initially, the frit is packed into the hole 8 around lead wire 6, which is bare, and then fused by any suitable means. Consequently, the surfaces of the section 1, electrode 4, and wire 6 in contact with the frit are wetted thereby and therefore become rigidly, sealingly, and substantially indestructibly bonded together when the molten frit solidifies.

Reference numeral 11 denotes any suitable magnetic field producing structure, for producing a magnetic field in the section, which field may be supposed to be directed perpendicular to the plane of the FIG. 1, in the usual fashion. The electrode lead wires 6 and 10 of course provide for connection to suitable electrical circuitry (not shown) which senses the voltages on the electrodes 3 and 4, and, in response thereto, performs one or another of various known measurement and/or control functions.

Figure 3:
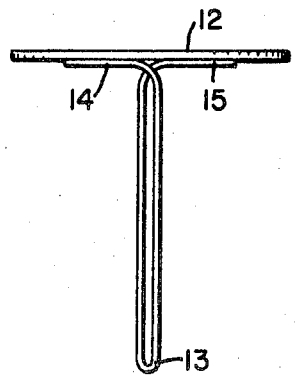
FIGS. 3 and 4 are elevations showing an actual embodiment of my novel electrode per se.
Figure 4:
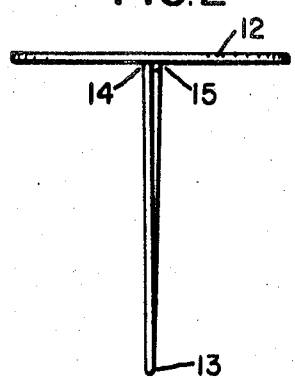

In practice, the electrode is constructed as shown in FIGS. 3 and 4, wherein reference numeral 12 denotes a lamina of platinum foil. A wire lead 13, shaped more or less like a hairpin, except in having end portions 14 and 15 bent over as indicated to allow substantial lengths of the lead to lie flat on the undersurface of laminae 12, in which position they are welded to said undersurface (welds not depicted in FIGS. 3 and 4). The lead 13 could instead be welded to the lamina at its lower end, of course. Lead wire 13 typically is made of a piece of wire about 3 inches long, each of the laminae typically being a circular disc 0.003 inch thick and about three-fourths inch in diameter, so that after being fused in place, their exposed surfaces are substantially coincident with the inner cylindrical surface of the section 1.

The section 1 may be made of various materials: stainless steel, plastic, ceramic (e.g., porcelain), fiberglass, etc. Naturally, unless the material is a nonconductor, or at least highly resistive as compared to the material flowing through it, it is necessary to insulate electrodes and lead wires from the section. Thus, in FIG. 5, reference numeral 16 represents the inner surface of a section 1 of, say, stainless steel, with hole 17 therethrough, corresponding to hole 8, FIG. 1. Unlike FIG. 1, a lamina 18 is shown underlying the electrode lamina 12. Lamina 18 is a fused layer of glass or ceramic, and underlies lamina 12 so as to electrically insulate it from the surface. The lamina 18 may cover the entire inner surface of the section 1, but for the present invention it is sufficient if it forms a continuous layer bonding the undersurface of layer 12 at every point therof to the surface 16. If the sealant 9 is of the same material as lamina 18, they would fusing, indistinguishable after fusing, and in any event it is necessary for the lamina 18 to bond the sealant 9, so the two will not be as distinct from each other as FIG. 5 indicates.

Figure 5:
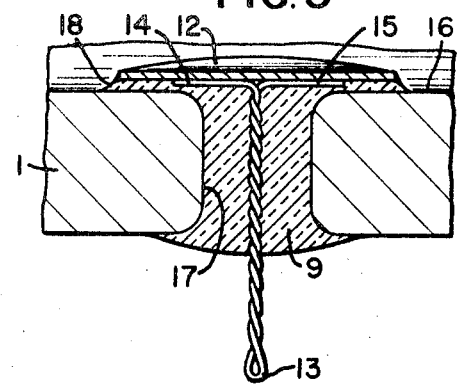
FIG. 5 is a fragmentary sectional view corresponding to that of FIG. 1, but enlarged, showing the electrode of FIG. 3 and 4 in place.

The arrangement of FIG. 5 is achieved by depositing lamina 18 on the surface 16 in unfused form (a paste, for example). The lamina 12 with the lead wire 13 welded thereto, but loosely twisted, as FIG. 5 shows, is set in place so that the lead wire passes out of the section 1, through hole 17, and the undersurface of lamina 12 is flush on the unfused lamina 18. The arrangement is then fired, as by directing a blow torch flame at the upper-surface of lamina 12, until the lamina 18 has fused and wet both the lamina 12 and the surface 16. When this happens, the lamina 18 becomes very thin, as the lamina 12 becomes, except for its upper surface, immersed in the molten material. If the sealant 9 is to be a fusable material, its fusion can be caused to take place simultaneously.

In any event, after the lamina 18 (and sealant 9) is in solid form, the results referred to in connection with FIG. 1 and 2 are achieved. It is to be understood that the dimensions of the laminae are exaggerated, Figure they are much thinner than the Figure may suggest. As noted before, the lamina 12 may be 0.003 inch thick. The lamina 18's thickness will be of the same order.

It is to be observed that the illustrated forms of the electrodes can also be provided, if the materials involved include plastics. For instance, lamina 18 can be a vinylidene fluoroplastic, such as Kynar, or the section itself could be Kynar. In this case, the lamina 12 would initially be primed on its under surface with Kynar, and then fused to the Kynar lamina 18 or surface 16 by heating, as before. Again, the lead wire of an electrode, without the electrode lamina may be sealed in place in a hole in the section 1 wall. The lamina 12 can then be printed in the form of conductive paste, on the sealant surface and lead wire end, at the inner end of the hole. The paste form electrode is then fired to the sealant and lead wire end.

Other combinations of insulating, sealing and conductive materials, which will bond together in the manner indicated supra, are known which will fall within the scope of my invention. The crucial characteristic is that the materials, after bonding, be fluid impervious, and bond together autogenously or exogenously, after the fashion of welding or soldering.

Having described my invention in accordance with 35 USC 112, I claim:

1. In an electromagnetic flow transducer comprising a section of conduit having field means or producing a magnetic field through said section and transverse to said section, said section also having electrodes exposed at the inner surface of said section and positioned on the wall thereof for picking up voltages in conductive liquid flowing through said section, the improvement wherein said electrodes are in the form of laminae, each having one surface integrally sealed into said inner surface, said section having holes through said wall at each electrode opening at said one surface and being totally covered by said electrode;

each said hole having a wire therein and extending therefrom to the exterior of said section, and fixed to said one surface of the corresponding said electrode;

each said hole being otherwise filled with sealant fixing the corresponding said wire in place.

2. The invention of claim 1 wherein said section is made of non-conductive material.

3. The invention of claim 1, wherein said section is made of non-conductive ceramic material providing said inner surface, each said lamina is made of metal providing said one surface, and said sealant is made of glass;

said one surface being fused into said inner surface and into said sealant, and said sealant being fused into the surfaces of said non-conductive ceramic material surrounding said holes.

4. The invention of claim 1, wherein said section is made essentially of conductive material, except that the portion thereof next adjacent to the electrodes is made of non-conductive material for insulating said electrodes from said conductive material, and said sealant being non-conductive for isolating said wires from said conductive material of said section.

5. The invention of claim 4, wherein said sealant is glass.

6. The invention of claim 4. wherein said electrodes are platinum.

* * * * *

UNITED STATES PATENT OFFICE
CERTIFICATE OF CORRECTION

Patent No. 3,746,896          Dated July 17, 1973

Inventor(s) Heinz Walter Gruner

It is certified that error appears in the above-identified patent and that said Letters Patent are hereby corrected as shown below:

Column 2, seventh line from bottom, "fusing," should be be.

Column 3, line 16, "Figure" should be -- namely, --.

Signed and sealed this 18th day of December 1973.

(SEAL)
Attest:

EDWARD M. FLETCHER, JR.
Attesting Officer

RENE D. TEGTMEYER
Acting Commissioner of Patents